United States Patent
Cnudde et al.

(10) Patent No.: US 8,312,548 B1
(45) Date of Patent: Nov. 13, 2012

(54) VOLUME METADATA UPDATE SYSTEM FOR ANTIVIRUS ATTRIBUTES

(75) Inventors: Isabelle Cnudde, Sunnyvale, CA (US); Rommel Dongre, Sunnyvale, CA (US); David Grunwald, Sunnyvale, CA (US); Wes Witte, Sunnyvale, CA (US)

(73) Assignee: Network Appliance, Inc., Sunnyvale, CA (US)

(*) Notice: Subject to any disclaimer, the term of this patent is extended or adjusted under 35 U.S.C. 154(b) by 743 days.

(21) Appl. No.: 12/429,913

(22) Filed: Apr. 24, 2009

(51) Int. Cl.
*G06F 11/00* (2006.01)
*G06F 11/30* (2006.01)
*G06F 7/00* (2006.01)

(52) U.S. Cl. ............. 726/24; 726/22; 713/188; 707/610

(58) Field of Classification Search ............. 726/22–24, 726/26; 713/164–165, 167, 188–189, 193; 707/610, 620, 624–626, 640, 644–647, 655–656
See application file for complete search history.

(56) References Cited

U.S. PATENT DOCUMENTS

| | | | |
|---|---|---|---|
| 5,473,769 A * | 12/1995 | Cozza | 714/39 |
| 6,021,510 A * | 2/2000 | Nachenberg | 714/38.14 |
| 6,735,700 B1 * | 5/2004 | Flint et al. | 726/24 |
| 6,763,466 B1 * | 7/2004 | Glover | 726/24 |
| 7,962,956 B1 * | 6/2011 | Liao et al. | 726/22 |
| 2002/0103783 A1 | 8/2002 | Muhlestein | |
| 2002/0107877 A1 * | 8/2002 | Whiting et al. | 707/204 |
| 2002/0116406 A1 * | 8/2002 | Goldick | 707/203 |
| 2002/0123992 A1 * | 9/2002 | Goldick | 707/4 |
| 2002/0129277 A1 * | 9/2002 | Caccavale | 713/201 |
| 2003/0110258 A1 | 6/2003 | Wolff et al. | |
| 2004/0010732 A1 * | 1/2004 | Oka | 714/13 |
| 2004/0068664 A1 * | 4/2004 | Nachenberg et al. | 713/200 |
| 2007/0156506 A1 * | 7/2007 | Hara | 705/10 |
| 2008/0046476 A1 * | 2/2008 | Anderson et al. | 707/200 |
| 2008/0134335 A1 * | 6/2008 | Kameda | 726/24 |
| 2009/0089880 A1 * | 4/2009 | Kobayashi et al. | 726/24 |
| 2009/0094698 A1 * | 4/2009 | Nichols et al. | 726/24 |
| 2011/0197279 A1 * | 8/2011 | Ueoka | 726/24 |

* cited by examiner

*Primary Examiner* — Darren B Schwartz
(74) *Attorney, Agent, or Firm* — Blakely, Sokoloff, Taylor & Zafman LLP

(57) ABSTRACT

A volume metadata manager manages volume metadata including antivirus attributes. When a volume is to be relocated, the volume metadata manager updates a generation indicator in volume-level metadata for the volume but does not update a generation indicator in file-level metadata for a file in the volume. After the volume is relocated, the volume metadata manager updates the generation indicator and antivirus attributes of the file when the file is requested for access.

18 Claims, 7 Drawing Sheets

VOLUME METADATA UPDATE SYSTEM FOR ANTIVIRUS ATTRIBUTES

FIELD OF THE INVENTION

The present invention relates to management of metadata for a storage system, and more specifically to updating metadata containing antivirus attributes for files in a volume managed by a storage system.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2009, NetApp, Inc., All Rights Reserved.

BACKGROUND OF THE INVENTION

A storage system can be implemented as a server device capable of providing storage related services upon requests from clients. Storage related services include a data access service through which clients can access data stored in storage devices managed by the storage system. To facilitate the data access service, the storage devices may include one or more groups of physical disks in which physical or logical volumes are defined.

A volume has its own metadata (i.e., volume metadata), which contain volume-global information that may pertain to one or more files residing on the volume. Volume metadata can be classified into two categories: volume-level metadata and file-level metadata. Volume-level metadata usually include volume-specific information such as file system type, volume creation time, and free space size. File-level metadata are associated with each file and include file-specific information such as file name, file size, and file attributes.

To maintain metadata consistency, a file system checks volume metadata, during which faulty or obsolete information will be identified and invalidated or updated. For example, when a volume needs to be relocated, file-level metadata, as well as volume-level metadata, should be checked for updates. In particular, it is required to check antivirus attributes in volume metadata for each file in the volume, and virus scanning is performed on the files if needed. However, as the size of a volume and the number of files residing on the volume increase, traversing each and every antivirus attribute may become time-consuming. Indeed, a volume may need to be taken offline for checking all the antivirus attributes for all the files in the volume, which inevitably causes an unavailability of the volume to the clients. Otherwise, a complex algorithm will be needed to keep track of what antivirus attributes have been invalidated or updated.

SUMMARY OF THE INVENTION

A volume metadata manager manages volume metadata including antivirus attributes. When a volume is to be relocated, the volume metadata manager updates a generation indicator in volume-level metadata for the volume but does not update a generation indicator in file-level metadata for a file in the volume. After the volume is relocated, the volume metadata manager updates the generation indicator and antivirus attributes of the file when the file is requested for access. Accordingly, relocation of a volume can be completed in a shorter period of time without interrupting data access services on the volume to clients.

The present invention is described in conjunction with systems, clients, servers, methods, and computer-readable media of varying scope. In addition to the aspects of the present invention described in this summary, further aspects of the invention will become apparent by reference to the drawings and by reading the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

A volume metadata manager, according to one embodiment of the present invention, is not required to traverse the antivirus attributes for all the files in a volume when the volume is relocated. Rather, the antivirus attributes are checked and updated later when a file in the relocated volume is requested for access. By adopting such a "lazy" update, a volume can be relocated without interrupting data access services to clients. Further, according to the "lazy" update, only the requested files are scanned (i.e., the files, which are never requested for access, are not scanned). Thus, antivirus attributes are checked and updated in a more efficient manner while the safety of the files provided to clients is still ensured.

Figure 1:
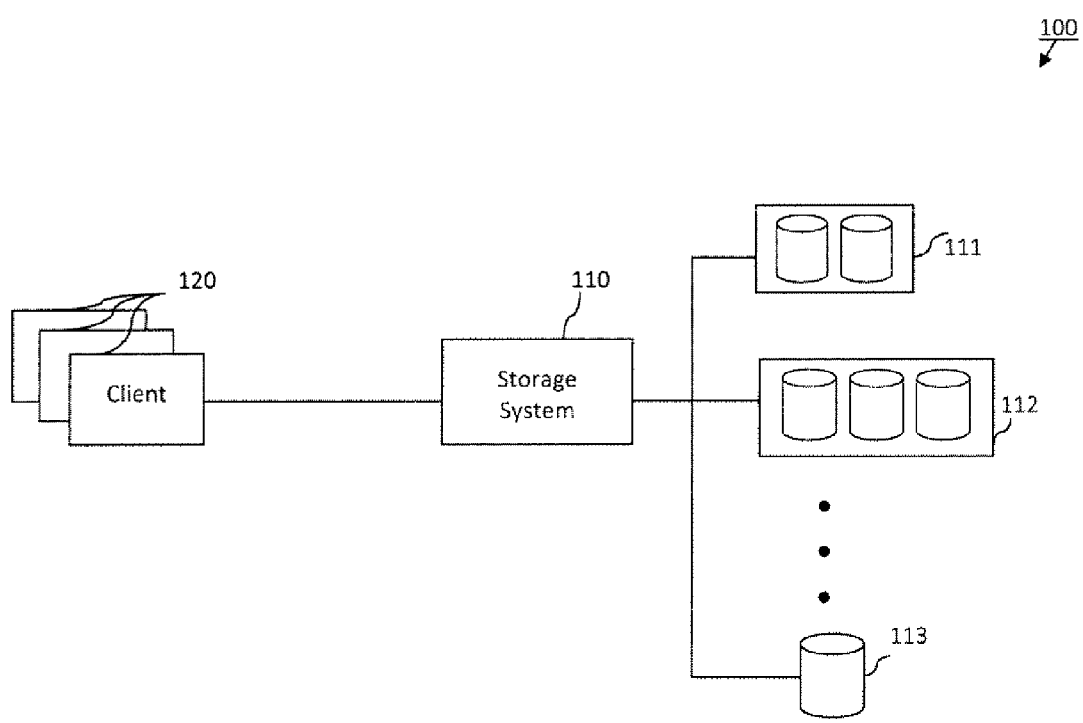
FIG. 1 illustrates a network connection overview of an exemplary system architecture in which embodiments of the present invention may operate.

FIG. 1 shows a network connection overview of an exemplary system architecture 100 in which the volume metadata manager may operate. The system architecture 100 includes a storage system 110 and clients 120.

The storage system 110 may be part of an enterprise network and may include one or more computing devices such as computers, workstations, severs or any other devices, which include a processor and a memory. The storage system 110 is responsible for providing storage related services to the clients 120. The storage system 110 is able to handle file-based requests and/or block-based requests from the clients 120 according to a client/server model of information delivery, allowing the clients 120 to access files stored on the storage devices 111, 112 and 113. The storage system 110 may be implemented as a system that includes a storage area network (SAN) device, a network attached storage (NAS) device, a direct attached storage (DAS) device, or any combination of SAN, NAS and DAS.

The storage system 110 communicates with one or more clients 120 directly or via one or more networks. The networks may include a LAN, WAN, intranet, extranet, wireless network, the Internet, etc. The clients 120 may include one or more computing devices such as computers, laptops, workstations, mobile devices, etc. The clients 120 request storage related services to the storage system 110 to access files in a volume managed by the storage system 110. To that end, the clients 120 issue file-based or block-based protocol messages (e.g., in the form of packets) to the storage system 110.

The storage system 110 also communicates with various storage devices 111, 112 and 113 directly or via one or more networks. The networks may include a LAN, WAN, intranet, extranet, wireless network, the Internet, etc. The storage devices 111, 112 and 113 may include memories, tapes, disks, Redundant Arrays of Inexpensive Disks (RAID) and any other optical, electrical or magnetic data recording media.

It will be appreciated that certain embodiments of the present invention may be implemented with solid-state memories including flash storage devices constituting storage array 111, 112 or 113. For example, the storage system 110 may be operative with non-volatile, solid-state NAND flash devices which are block-oriented devices having good (random) read performance, i.e., read operations to flash devices are substantially faster than write operations. Data stored on a flash device are accessed (e.g., via read and write operations) in units of pages, which in the present embodiment are 4 kB in size, although other page sizes (e.g., 2 kB) may also be used.

When the flash storage devices are organized as one or more parity groups in a RAID array, the data is stored as stripes of blocks within the parity groups, wherein a stripe may constitute similarly located flash pages across the flash devices. For example, a stripe may span a first page 0 on flash device 0, a second page 0 on flash device 1, etc. across the entire parity group with parity being distributed among the pages of the devices. Note that other RAID group arrangements are possible, such as providing a RAID scheme wherein every predetermined (e.g., 8th) block in a file is a parity block.

In one embodiment, the storage devices 111, 112 and 113 are managed by the storage system 110 as one or more aggregates of volumes (logical or physical) defining an overall logical arrangement of disk space provided by the storage devices 111, 112 and 113. In one embodiment, a logical or physical volume is comprised of a cluster of physical disks or portions of physical disks, which can be distributed over one or more networks.

A volume has its own metadata (i.e., volume metadata), which contain volume-global information that may pertain to one or more files residing on the volume. Volume metadata may be classified into two categories: volume-level metadata and file-level metadata. Volume-level metadata generally include volume-specific information such as file system type, volume creation time, and free space size. File-level metadata are associated with each file and include file-specific information such as file name, file size, and file attributes.

In one embodiment, the storage system 110 is equipped with security functionality to protect resources, including data contained in files, from viruses. In general, the term "virus" refers to a program or piece of code that is loaded onto a computer system without the user's knowledge and runs against the user's wishes. Most viruses are able to replicate themselves, and some of them are even capable of transmitting themselves across a network. A virus also refers to any malicious code that could damage, destroy or alter any resources in a computer system.

In one embodiment, the security functionality is implemented as an antivirus scanner in the storage system 110, which scans one or more files for viruses. Based on the results of the scan, a volume metadata manager implemented in the storage system 110 records or updates antivirus information (e.g., whether a file is contaminated by any known virus code) in volume metadata. In one embodiment, antivirus attributes are used to store such antivirus information in file-level metadata and volume-level metadata. The antivirus attributes are associated with each file in a volume.

However, the antivirus scanner does not have to cheek the antivirus attributes when the volume is relocated due to generation indicators stored in both volume-level metadata and file-level metadata. As will be described in more detail below, the volume metadata manager utilizes the generation indicators to postpone checking and/or updating the antivirus attributes until a file in a volume is requested for access (after the volume is relocated). The security of the files can still be ensured under the delayed checking process.

Figure 2:
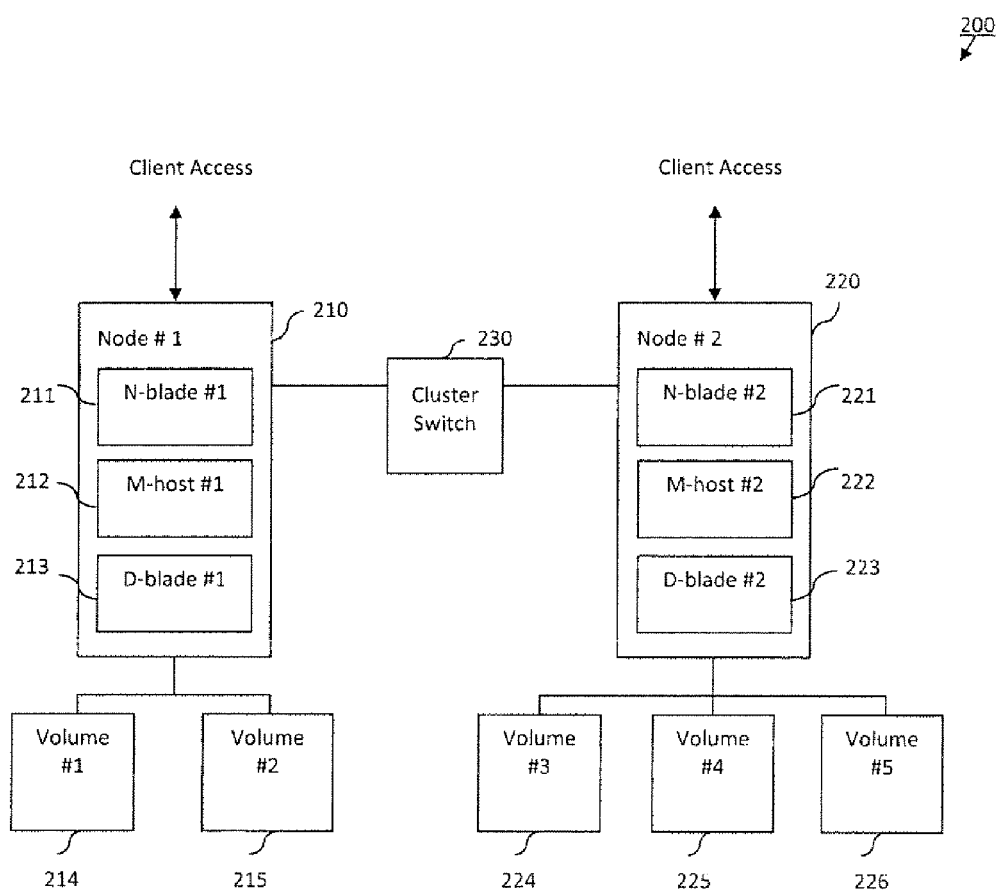
FIG. 2 is a block diagram of an exemplary computer cluster implemented in the storage system shown in FIG. 1.

FIG. 2 is a block diagram of an exemplary computer cluster 200 implemented in the storage system shown in FIG. 1. The computer cluster 200 may be the storage system 110 or a part of the storage system 110, which is a group of networked computers to provide storage related services to network clients (e.g., the clients 120 shown in FIG. 1).

The computer cluster 200 may include a first cluster node 210, a second cluster node 220 and a cluster switch 230. The first and second cluster nodes 210 and 220 may include one or more computing devices, network devices, etc. In this embodiment, the first cluster node 210 includes a network component (N-blade #1) 211, a management component (M-host #1) 212 and a data component (D-blade #1) 213, and the second cluster node 220 includes a network component (N-blade #2) 221, a management component (M-host #2) 222 and a data component (D-blade #2) 223. The N-blades 211 and 221, the M-hosts 212 and 222, and the D-blades 213 and 223 communicate with one another directly or via a network. The cluster switch 230 may include one or more computing devices and/or one or more network devices to facilitate a connection of the cluster nodes 210 and 220. Ethernet may be used as the clustering protocol, and the cluster switch 230 may be embodied as a Gigabit Ethernet switch. Although the illustrative cluster architecture shows one-to-one correspondence among the N-blades, the M-hosts and the D-blades, there may be different numbers of N-blades, M-hosts and/or D-blades in a cluster. Alternatively, the storage system 110 may not have an N-blade, an M-host, a D-blade, or any combination of those.

The N-blades 211 and 221 enable the cluster nodes 210 and 220 to connect to network clients or any other network entities over a network, respectively. The M-hosts 212 and 222 provide management services including antivirus management services to the network clients. The N-blades 211 and 221 receive and process requests from network clients based on various network file system protocols (e.g., Common Internet File System (CIFS), Network File System (NFS), etc.). The processed requests are forwarded to one of the D-blades 213 and 223 identified by the requests. For example, a request related to volume 214 is forwarded to the D-blade 213. The D-blade 213 manages volumes 214 and 215, and the D-blade 223 manages volumes 224, 225 and 226. Thus, the D-blades 213 and 223 perform the client requests and forward the results to the N-blades 211 and 221, which return the results to the network clients.

In particular, each of the D-blades 213 and 223 manages volume metadata for its own volumes. The D-blade 213 is responsible for managing antivirus attributes and generation indicators provided in the volume metadata of volumes 214 and 215. Likewise, the D-blade 223 is responsible for managing antivirus attributes and generation indicators in the volume metadata of volumes 224, 225 and 226.

Each of the volumes 214, 215, 224, 225 and 226 contains one or more files and is defined on groups of disks or parts of disks. In one embodiment, each volume is allocated to one or more RAID groups, and each RAID group belongs exclusively to a single volume. In another embodiment, each volume is a flexible virtual volume that is not tied to one or more physical storage devices (e.g., RAID groups).

As discussed above, each volume has its own volume metadata that may include volume-level metadata and file-level metadata. Antivirus information about each file in a volume is provided as antivirus attributes (e.g., whether the file is infected, what version of antivirus software is used to scan the file, etc.) in both volume-level metadata and file-level metadata. A generation number for a volume, as an example of the generation indicator for the volume, is included in volume-level metadata, and a generation number for each file in the volume, as an example of the generation indicator for each file in the volume, is included in file-level metadata. As described below, the generation numbers of the volume and each file in the volume can collectively indicate whether antivirus scanning is needed for the particular file.

Figure 3:
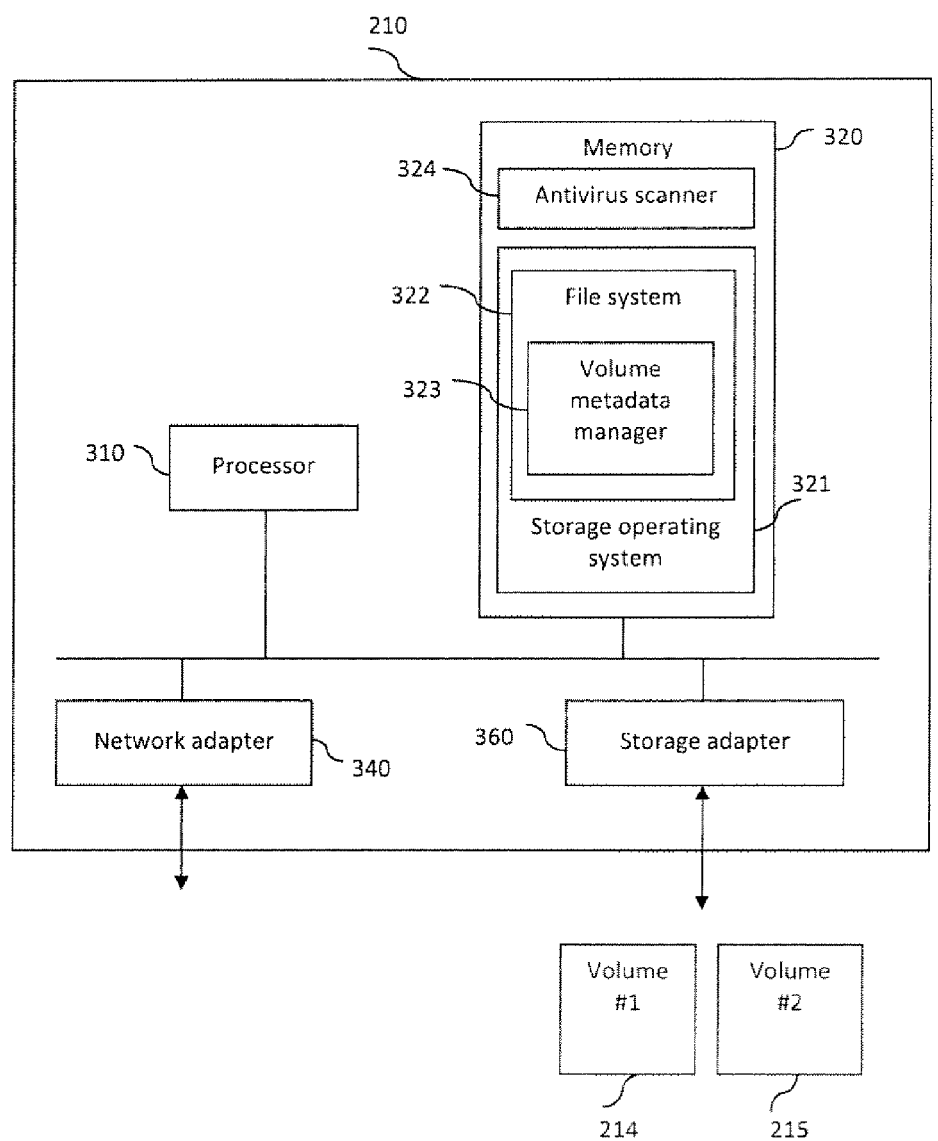
FIG. 3 is a block diagram of an exemplary architecture of the cluster node shown in FIG. 2.

FIG. 3 is a block diagram of an exemplary architecture of the cluster node 210 shown in FIG. 2. The cluster node 210 includes processor 310, a memory 320, a network adaptor 340 and a storage adaptor 360.

The memory 320 encompasses all volatile storage media, such as dynamic random access memory (DRAM) and static RAM (SRAM). The memory 320 includes storage locations that are addressable by the processor 310, the network adaptor 340, and the storage adapter 360 for storing computer program code and data structures for the volume metadata manager. Such computer program code and data structures be stored in non-volatile storage media, such as any type of disk including floppy disks, optical disks such as CDs, DVDs and BDs (Blu-ray Disks), and magnetic-optical disks, magnetic or optical cards, or any type of media, and may be loaded onto the memory 320. Such non-volatile storage media can be a part of the cluster node 210 or the storage system 110. Those skilled in the art will immediately recognize that the term "computer-readable storage medium" includes any type of volatile or non-volatile storage device that is accessible by a processor.

The processor 310, the network adapter 340 and the storage adapter 360 include processing elements and/or logic circuitry configured to execute the computer program code and manipulate the data structures. The storage operating system 321, portions of which are typically resident in the memory 320 and executed by the processor 310, invokes storage operations in support of storage related services for network clients. It will be apparent to those skilled in the art that other processing and memory means, including various computer readable storage media, may be used for storing and executing computer program code pertaining to the volume metadata manager.

The storage operating system 321 implements a file system 322 to logically organize the information as a hierarchical structure of files in the volumes 214 and 215 on storage devices (e.g., storage devices 111, 112 and 113 shown in FIG. 1) and to facilitate access to the files by network clients (e.g., the clients 120 shown in FIG. 1). In the file system 322, each file may be implemented as a set of disk blocks configured to store information. In one embodiment, the file system 322 includes a volume metadata manager 323, which is responsible for generating and updating generation numbers for the volumes 214 and 215. The volume metadata manager 323 examines the generation numbers and antivirus attributes for a file and causes antivirus scanning to be performed on the file when needed. Based on the scanning result, the volume metadata manager 323 updates the antivirus attributes. Alternatively, the volume metadata manager 323 may be implemented as another part of the storage operating system 321 or as an application program separate from the storage operating system 321. Yet alternatively, at least part of the volume metadata manager 323 may be implemented as circuitry or firmware.

An antivirus scanner 324 implements security functionality. In one embodiment, the antivirus scanner 324 has virus definitions and/or a virus-scanning program. The virus definitions and/or the virus-scanning program may be updated (e.g., periodically) and have their own version numbers. The current version number may be stored as configuration information in memory 320 and/or held in the antivirus scanner 324. Alternatively, the antivirus scanner 324 itself may be updated and have its own version number.

In one embodiment, at the request of the volume metadata manager 323, the antivirus scanner 324 scans a file to check whether the file is infected by any virus code and provides the scanning result to the volume metadata manager 323. In another embodiment, the antivirus scanner 324 initiates scanning of a file and provides the result to the file system 322 without a request from the volume metadata manager 323. In yet another embodiment, a system administrator initiates scanning of a file. The antivirus scanner 324 can be implemented as an application program or as part of the storage operating system 321. Alternatively, at least part of the antivirus scanner 324 can be implemented as circuitry or firmware.

The network adapter 340 includes the mechanical and signaling circuitry needed to connect the cluster node 210 to network clients (e.g., the clients 120 shown in FIG. 1) directly or via one or more networks. The network clients interact with the cluster node 210 in accordance with a client/server model of information delivery. The network clients request the services of the cluster node 210, and the cluster node 210 returns the results of the services requested by the network clients, by exchanging data packets encapsulated under various protocols CIFS, NFS, etc.).

The storage adapter 360 retrieves information requested by the network clients. The information is stored on the volumes 214 and 215 managed by the cluster node 210. The storage adapter 360 includes input/output (I/O) interface circuitry that couples to the volumes 214 and 215 over an I/O interconnect arrangement, such as a high-performance, Fibre Channel link topology. The information retrieved by the storage adapter 360 is, if needed, processed by the processor 310 (or the storage adapter 360 itself) prior to being forwarded to the network adapter 340. The network adapter 340 formats the forwarded information into one or more packets and returns the packets to the network clients.

Although in the above embodiment, one single processor and one single memory are illustrated for simplification, one or more processors and/or one or more memories can be implemented for each component or some components of the first cluster node 210 (N-blade 211, M-host 212, or D-blade 213 in FIG. 2). In addition, the second cluster node 220 of FIG. 2 may be organized similar to the first cluster node 210 as discussed above although FIG. 3 only illustrates an exemplary architecture of the first cluster node 210 for simplification. Finally, a storage system, which does not have logically or physically divided components (e.g., the N-blade 211, M-host 212 and D-blade 213 of FIG. 2), can have an architecture similar to the first cluster node 210.

Figure 4:
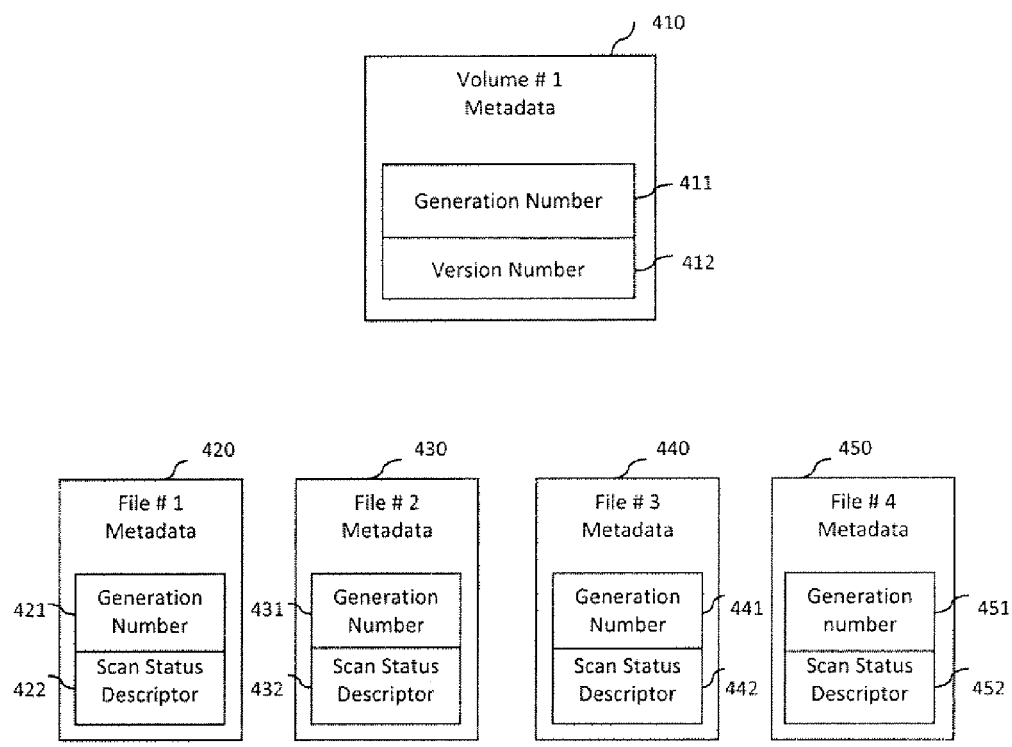
FIG. 4 illustrates an exemplary metadata structure for a volume in accordance with embodiments of the present invention.

FIG. 4 illustrates an exemplary metadata structure for a volume that can be used by the volume metadata manager 323 of FIG. 3. Metadata contain descriptive information (e.g., name, data type, etc.) regarding data for a file system (e.g., the file system 322 of FIG. 3) to manage and locate the data.

Referring to FIG. 4, volume metadata for volume #1 include volume-level metadata 410 and file-level metadata 420, 430, 440 and 450, which are associated with file #1, file #2, file #3 and file #4, respectively. Volume-level metadata 410 includes a generation number 411 and a version number 412. Alternatively, the version number 412 may be included in each of the file-level metadata 420, 430, 440 and 450.

In one embodiment, the generation number 411 is set to zero (0) when volume #1 is created for the first time. Subsequently, if volume #1 is to be relocated (e.g., to be moved to a different cluster node), the generation number 411 is incremented by, for example, one (1). As such, the generation number 411 in volume-level metadata 410 is updated whenever volume #1 is relocated.

The version number 412 is used as an antivirus attribute for all of the files in volume #1 (i.e., files #1, #2, #3 and #4). In one embodiment, the version number 412 corresponds to a version of virus definitions adopted by the antivirus scanner 324 of FIG. 3. In another embodiment, the version number 412 corresponds to a version of a virus-scanning program used by the antivirus scanner 324. In yet another embodiment, the version number 512 corresponds to a version of the antivirus scanner 424. In each of the above embodiments, the current version number is stored as configuration information for a cluster node (e.g., in the memory 320 of FIG. 2). Alternatively, the current version number can be obtained from the antivirus scanner 324.

Each cluster adopts its own virus definitions, its own virus-scanning program, or its own antivirus scanner. In one embodiment, the version number of volume #1 is associated with the cluster 200 (of FIG. 2) to which volume #1 belongs. Thus, the version number is unique within its own cluster. Alternatively, the version number 412 may be associated with a storage system (e.g., the storage system 110 of FIG. 1) or a part of a storage system (e.g., the D-blade 213 of FIG. 2).

The file-level metadata 420, 430, 440 and 450 include a generation number 421, 431, 441 and 451, respectively. In addition, scan status descriptors 422, 432, 442 and 452 are provided as antivirus attributes in file-level metadata 420, 430, 440 and 450, respectively.

The generation numbers 421, 431, 441 and 451 are set to zero (0) when files #1, #2, #3 and #4 are created for the first time, respectively. However, in one embodiment, the generation numbers 421, 431, 441 and 451 are not be uniformly updated when the generation number 411 of the volume-level metadata 410 is updated (e.g., when volume #1 is to be relocated). As a result, some or all of the generation numbers 421, 431, 441 and 451 remain inconsistent with the generation number 411 of the volume-level metadata 410. For example, when volume #1 is moved to a different cluster node, only the generation number 411 of the volume metadata 410 is updated at that time. The generation numbers 421, 431, 441 and 451 of the file-level metadata is not changed. Instead, each of the file-level generation numbers 421, 431, 441 and 451 is separately updated later when the corresponding file needs to be accessed (e.g., upon a request from a client).

The scan status descriptors 422, 432, 442 and 452 describe whether files #1, #2, #3 and #4 are infected by any virus code, respectively. In one embodiment, the scan status descriptors are expressed as "CLEAN," or "INFECTED" in accordance with the scanning result of a corresponding file.

Figure 5A:
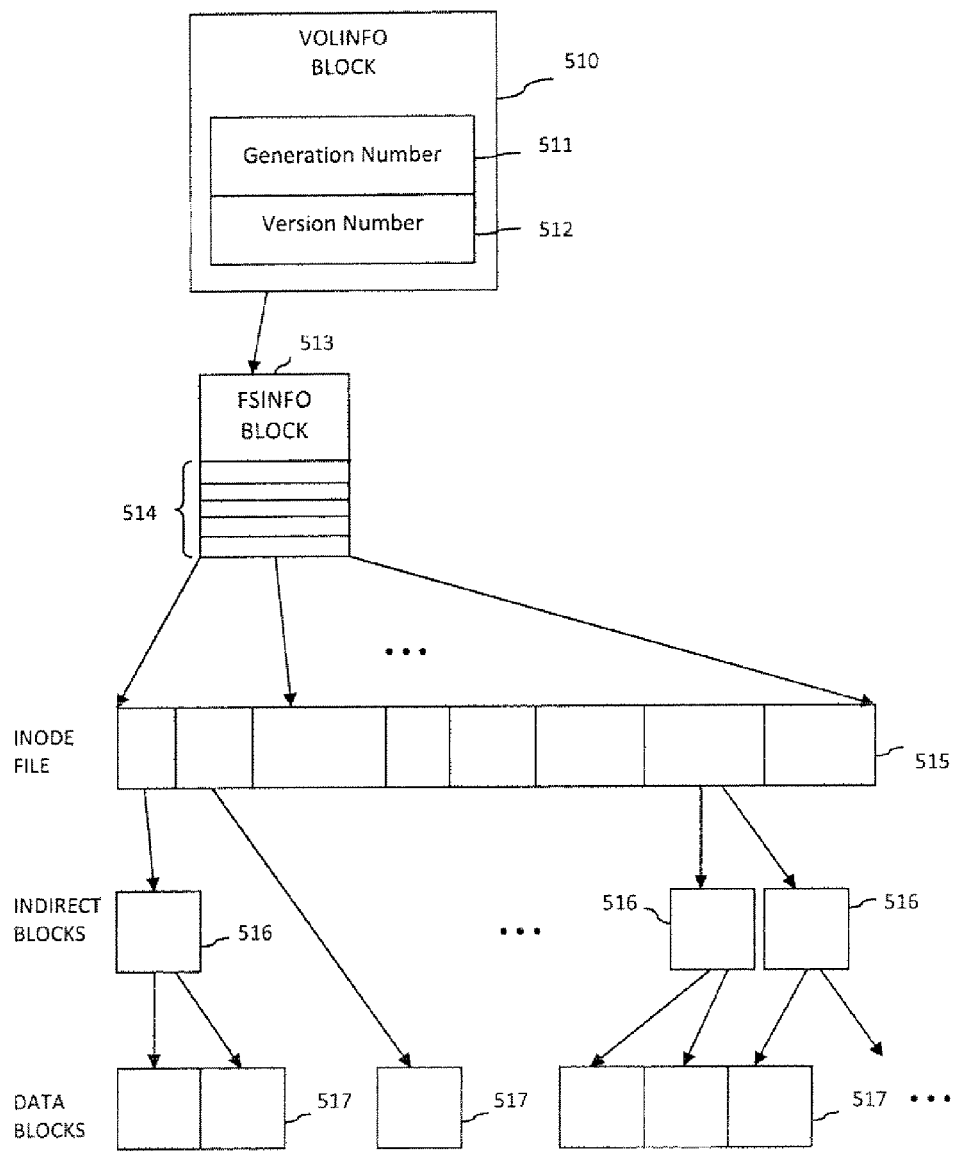
FIGS. 5A and 5B illustrate another exemplary metadata structure of a volume for a write-anywhere file system in accordance with embodiments of the present invention.
Figure 5B:
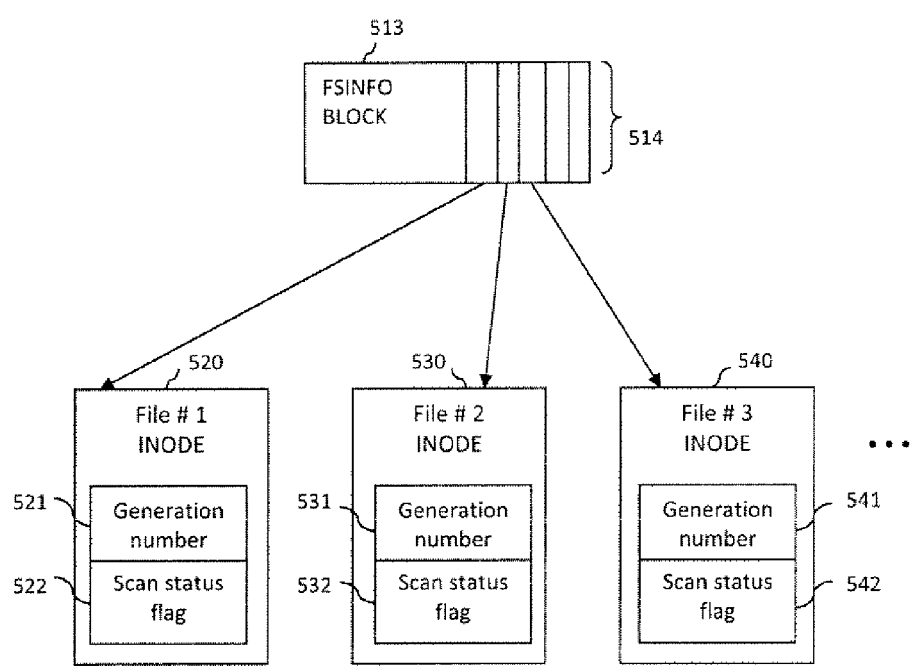

FIGS. 5A and 5B illustrate another exemplary metadata structure of volume #3 in FIG. 2 for a write-anywhere file system. In one embodiment, volume #3 is one of flexible volumes defined by adding a virtualization layer between client-visible volumes (i.e., virtual volumes) and the underlying physical storages. The flexible volumes are managed independent of lower storage layers; multiple volumes can be dynamically created, deleted, resized and reconfigured within the same physical storage devices. Accordingly, a flexible volume can have a logical size that exceeds the available physical storage.

Volume #3 is configured as a hierarchical structure in accordance with the write-anywhere file system. Referring to FIG. 5A, volume #3 includes a volinfo block 510 at the top of the hierarchical structure. The volinfo block 510 includes metadata describing volume #3 and contains a block pointer that references an fsinfo block 513. The fsinfo block 513 is associated with an inode buffer tree by including a set of root inodes 514 and pointers to an inode file 515. The inode file 515, in turn, describes all other files in volume #3, including multiple inodes referencing indirect blocks 516 and data blocks 517. The data blocks 517 contain user data of a file. There may be additional layers of indirect blocks depending upon pertinent factors such as the size of a block or a file.

The volinfo block 510 includes a generation number 511 and a version number 512, which have similar meanings and play similar roles as those discussed above in conjunction with FIG. 4. In one embodiment, both the generation number 511 and the version number 512 are allotted sixteen (16) bits, and both are set to zero (0) when volume #3 is created for the first time. The generation number 511 is changed (e.g., incremented) when volume #3 is moved to another cluster node. In one embodiment, the generation number 511 is also changed to a non-zero value when the version number 512 is changed from zero (0) to a current version number, for example, when a file of volume #3 is scanned for viruses for the first time.

On the other hand, the version number 512 is not updated when the cluster (to which volume #3 belongs) changes its virus definitions, its virus-scanning program, or its antivirus scanner to a new version. Instead, the version number 512 is updated when volume #3 is requested for access (i.e., when a file in volume #3 is scanned by an antivirus scanner). Meanwhile, the version number 512 is reset to zero (0) when volume #3 is moved to another cluster if the version number 512 is a cluster-global number (e.g., each cluster adopts its own virus-scanning program).

In one embodiment, if the generation number 511 and the version number 512 are both zero (0), it indicates that volume #3 is just created, and virus scanning is not yet performed on any file in volume #3. If the generation number 511 is not zero (0), but the version number 512 is zero (0), it indicates that volume #3 is moved from another cluster node (and thus, the generation number 511 is updated to the non-zero number, and the version number 512 is reset to zero (0)). If the generation number 511 is zero (0), but the version number 512 is not zero (0), it indicates that an error occurred (because such a value pair is invalid). Finally, when the generation number 511 and the version number 512 are both non-zero numbers, it indicates that no error occurred in the generation number and version number management.

FIG. 5B illustrates an exemplary detailed structure of the inodes in the inode file 515 of FIG. 5A in accordance with the write-anywhere file system. Referring to FIG. 5B, the set of root inodes 514 points to the inodes 520, 530 and 540. The inode 520 is associated with file #1, the inode 530 is associated with file #2, and the inode 540 is associated with file #3. The inodes 520, 530 and 540 include metadata of files #1, #2, and #3, respectively. The inodes 520, 530 and 540 and/or the inodes in the inode file 515 may include a virtual volume block number (vvbn) and a physical volume block number (pvbn) to implement a flexible volume. The vvbn-pvbn pair is used to translate a block number of a block in volume #3 into a physical volume block number that specifies the block's location within the corresponding physical storage devices (e.g., data blocks 517 of FIG. 5A used to store user data of a file).

An inode of a file contains a generation number and a scan status flag. For example, the inode 520 contains a generation number 521 and scan status flag 522 for file #1, the inode 530 contains a generation number 531 and scan status flag 532 for file #2, and the inode 540 contains a generation number 541 and scan status flag 542 for file #3. The generation numbers 521, 531 and 541, and the scan status flags 522, 532 and 542 may have similar meanings and play similar roles as the generation numbers and scan status descriptors discussed above in conjunction with FIG. 4.

In one embodiment, each generation number is allotted sixteen (16) bits, and each scan status flag is allotted one (1) bit. The generation numbers 521, 531 and 541 are set to zero (0) when files #1, #2 and #3 have been created for the first time, respectively. The generation numbers 521, 531 and 541 are not updated when volume #3 is moved. Instead, the generation numbers 521, 531 and 541 are separately updated to the generation number 511 in the volinfo block 510 when files #1, #2 and #3 are requested by a client, respectively (after volume #3 is moved). For example, the generation number 521 is updated along with virus scanning on file #1. The scan status flag 522 for file #1 is updated based on the scanning result. In one embodiment, if a client requests a write to file #1, the generation number 521 (and/or the scan status flag 522) is reset to zero (0) to indicate that the scan status of file #1 is "UNKNOWN" and thus, file #1 needs to be scanned.

In one embodiment, if the generation number 531 of file #2 is zero (0), the scan status of file #2 is deemed to be "UNKNOWN," regardless of the value of the scan status flag 531. The "UNKNOWN" scan status indicates that file #2 needs to be scanned. If the generation number 541 of file #3 is not zero (0) and the scan status flag 542 is zero (0), then the scan status of file #3 may be regarded as "CLEAN" (depending upon the version number 512 in FIG. 5A as described below). If the scan status flag 542 is one (1), and the generation number 541 is not zero (0), the scan status of file #3 may be regarded as "INFECTED" (depending upon the version number 512 as described below).

Meanwhile, if the version number 512 in the volinfo block 510 in FIG. 5A is not the current version number, it indicates none of files #1, #2 and #3 is scanned with the current version. In that case, the scan statuses of files #1, #2 and #3 are ignored, and a new scanning with the current version should be performed on files #1, #2 and #3 before access is allowed to the files. Subsequently, the scan status flags 522, 532 and 542 are changed based on the new scanning results.

Figure 6:
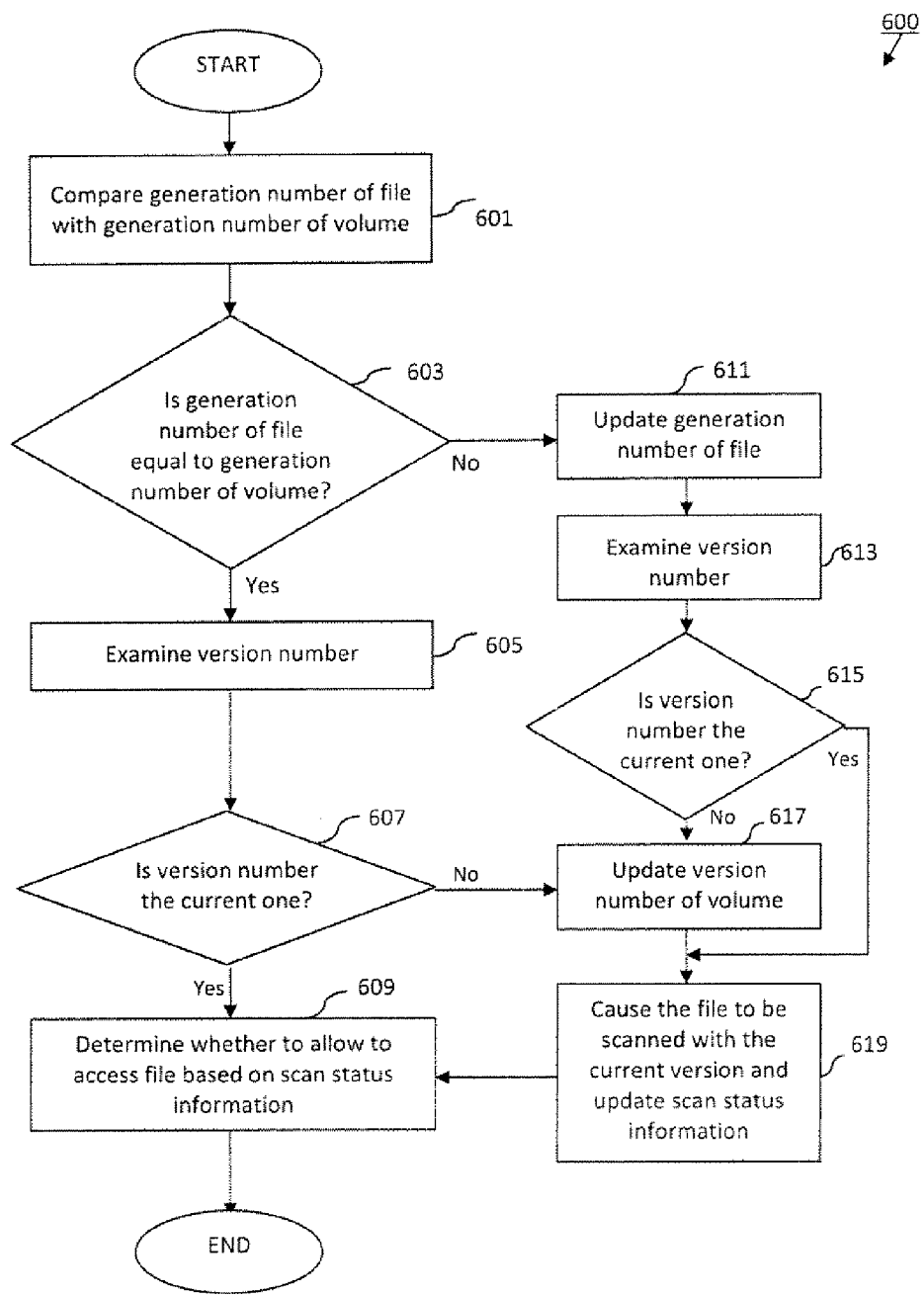
FIG. 6 illustrates a flow diagram of a volume metadata management method in accordance with embodiments of the present invention.

FIG. 6 illustrates a flow diagram of one embodiment of a volume metadata management method 600 that can be executed on a computer system such as a cluster node (e.g., cluster node 210 of FIG. 2). In one embodiment, the volume metadata management method 600 is performed by the volume metadata manager 323 of FIG. 3.

Referring to FIG. 6, the method 600 compares the generation number of a file and the generation number of the volume including the file when the file needs to be accessed (block 601). For a file system as shown in FIG. 4, when file #1, #2, #3, or #4 is requested for access, whether there is a discrepancy between the volume-level generation number 411 and the file-level generation number 421, 431, 441, or 451 is checked, respectively. For example, if file #1 is requested by a network client, the generation number 421 of file #1 is compared with the generation number 411 of volume #1 to which file #1 belongs. For a write-anywhere file system as shown in FIGS. 5A and 5B, when file #1, #2, or #3 is requested for access, the generation number 511 in the volinfo block 510 is compared with the generation number 521, 531, or 541 in the inodes 520, 530, or 540. For example, if file #2 is requested by a client, the generation number 531 in the inode 530 of file #2 is compared with the generation number 511 in the volinfo block 510.

If the file-level generation number is equal to the volume-level generation number (block 603), the method 600 compares the version number stored in the volume metadata with the current version number (block 605). The version number may correspond to a version of virus definitions, a virus-scanning program, or an antivirus scanner. In one embodiment, the current version number (of virus definitions, a virus-scanning program, or an antivirus scanner) is stored in memory (e.g., the memory 320 of FIG. 3). In another embodiment, the current version number is obtained from the antivirus scanner (e.g., the antivirus scanner 324 of FIG. 3).

In one embodiment, at block 605, the method 600 examines the version number recorded in the volume metadata and the scan status information of the requested file as a set of antivirus attributes of the file. During the examination of the set of antivirus attributes, the method 600 checks the version number first. For a file system as shown in FIG. 4, the version number 412 and the scan status descriptor 422 are examined as a set of antivirus attributes of file #1 (as long as the generation number 421 of file #1 is equal to the generation number 411 of volume #1, which indicates that file #1 has been accessed, and the file-level generation number 421 has been updated). However, the version number 412 is examined before the scan status descriptor 422. For a write-anywhere file system as shown in FIGS. 5A and 5B, the version number 512 in the volinfo block 510 and the scan status flag 532 in the inode 530 are examined as a set of antivirus attributes of file #2 (as long as the generation number 531 in the inode 530 of file #2 is equal to the generation number 511 in the volinfo block 510, which indicates that file #2 has been accessed, and the generation number 531 for file #2 has been updated). However, the version number 512 is examined before the scan status flag 532.

If the version number of the volume is the current version number (block 607), the method 600 uses the current scan status information in file-level metadata to determine whether to allow access to the file (block 609). For a file system as shown in FIG. 4, if the version number 412 reflects the current version (of virus definitions, a virus-scanning program, or an antivirus scanner), the current scan status descriptor 422 is used to determine whether to allow access to file #1 without additional virus scanning. For example, if the scan status descriptor 422 is "CLEAN," access is allowed to file #1. If file #1 is successfully quarantined when the scan status descriptor 422 is "INFECTED," access is also allowed to file 41. Otherwise, the access request for file #1 is denied.

For a write-anywhere file system as shown in FIGS. 5A and 5B, if the version number 512 in the volinfo block 510 reflects the current version number (of virus definitions, a virus-scanning program, or an antivirus scanner), the current scan status flag 532 is used to determine whether to allow access to file #2 without additional virus scanning. For example, if the scan status flag 532 is "CLEAN," access is allowed to file #2. If file #2 is successfully quarantined when the scan status flag 532 is "INFECTED," access is also allowed to file #2. Otherwise, the access request for file #2 is denied.

At block 607, if the version number stored in the volume metadata is not equal to the current version number, the method 600 replaces the stored version number with the current version number (block 617). The method 600 also causes the file to be scanned with the current version and updates the scan status information of the file based on the scanning result (block 619). The method 600 then returns to block 609.

For a file system as shown in FIG. 4, if the version number 412 is different from the current version (even though the volume-level and file-level generation numbers are the same), the scan status descriptor 422 is ignored, and the current scan status of file #1 is regarded as "UNKNOWN." Subsequently, the version number 412 is updated to the current version number, and file #1 is scanned with the current version (of virus definitions, a virus-scanning program, or an antivirus scanner). The scan status descriptor 422 is then updated according to the scanning result.

For a write-anywhere file system as shown in FIGS. 5A and 5B, for example, if the version number 512 in the volinfo block 510 is different from the current version number (even though the volume-level and file-level generation numbers are the same), the scan status flag 532 of file #2 is ignored, and the current scan status of file #2 is regarded as "UNKNOWN." Subsequently, the version number 512 is updated to reflect the current version (of virus definitions, a virus-scanning program, or an antivirus scanner). Also, file #2 is scanned with the current version. The scan status flag 532 is then updated according to the scanning result.

At block 603, if the file-level generation number is not equal to the volume-level generation number, the method 600 updates the generation number of the file to the generation number of the volume (block 611). The method 600 examines the version number stored in the volume metadata (block 613). If the stored version number is not the current version number (block 615), the method 600 changes the recorded version number of the volume to reflect the current version (of virus definitions, virus-scanning program, or antivirus scanner) (block 617). At block 619, the method causes the file to be scanned with the current version and updates the scan status information of the file based on the scanning result. The method 600 then returns to block 609.

For a file system as shown in FIG. 4, if the generation number 421 of file #1 is different from the generation number 411 of volume #1 to which file #1 belongs, (indicating that file #1 has not been accessed since volume #1 was relocated), the scan status descriptor 422 in the metadata of file #1 is ignored, and the current scan status of file #1 is regarded as "UNKNOWN." Thus, the version number in the volume metadata is replaced with the current version number (if different), and file #1 is scanned with the current version of virus definitions, a virus-scanning program, or an antivirus scanner. The scan status descriptor 422 is then updated according to the scanning result.

For a write-anywhere file system as shown in FIGS. 5A and 5B, if the generation number 531 in the inode 530 of file #2 is different from the generation number 511 in the volinfo block 510 of the volume to which file #2 belongs, the scan status flag 532 in the inode 530 of file #2 is ignored, and the current scan status of file #2 is regarded as "UNKNOWN." Subsequently, the version number in the volinfo block 510 is replaced with the current version number (if different), and file #2 is scanned with the current version of virus definitions, a virus-scanning program, or an antivirus scanner. The scan status flag 532 is then updated according to the scanning result.

In the above embodiment, although the volume metadata management method 600 updates the generation number of a file before the file is scanned, the file-level generation number can be updated after the file is scanned with the current version of, e.g., a virus-scanning program. Likewise, the version number in the volume metadata can be updated after the file is scanned if the version number does not reflect the current version of, e.g., a virus-scanning program.

As such, by updating only the volume-level generation number (i.e., updating the file-level generation number and/or antivirus attributes is postponed until a file in the volume is later requested for access), relocation of a volume can be completed in a shorter period of time.

In practice, the volume metadata management method may constitute one or more programs made up of computer-executable instructions. Describing the method with reference to the flow diagram in FIG. 6 enables one skilled in the art to develop such programs, including such instructions to carry out the operations (acts) represented by logical blocks 601 through 619 on suitably configured computers (the processor of the computer executing the instructions from computer-readable media). The computer-executable instructions may be written in a computer programming language or may be embodied in firmware logic or in hardware circuitry. If written in a programming language conforming to a recognized standard, such instructions can be executed on a variety of hardware platforms and for interface to a variety of operating systems.

The volume metadata management method is not described with reference to any particular programming language. It will be appreciated that a variety of programming languages may be used to implement the teachings of the present invention as described herein. Furthermore, it is common in the art to speak of software, in one form or another (e.g., program, procedure, process, application, module, logic, etc.), as taking an action or causing a result. Such expressions are merely a shorthand way of saying that execution of the software by a computer causes the processor of the computer to perform an action or produce a result. It will be further appreciated that more or fewer processes may be incorporated into the volume metadata management method 600 illustrated in FIG. 6 without departing from the scope of the invention and that no particular order is implied by the arrangement of blocks shown and described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    updating, by a processor in a storage system, a generation indicator of a volume without updating a generation indicator of a file in the volume when the volume is relocated;
    comparing the generation indicator of the file with the generation indicator of the volume when the file is requested for access;
    when the generation indicator of the file is equal to the generation indicator of the volume, examining antivirus information of the file;
    determining whether to allow access to the file based on the antivirus information; and
    updating, by the storage system, the generation indicator of the file and the antivirus information of the file when the file is requested for access, the request occurring after the volume is relocated.

2. The method of claim 1, wherein updating the generation indicator of the file further comprises:
    when the generation indicator of the file is not equal to the generation indicator of the volume, causing, by the storage system, the file to be scanned for viruses.

3. The method of claim 2, wherein updating the generation indicator of the file further comprises:
    when the generation indicator of the file is not equal to the generation indicator of the volume, updating the generation indicator of the file to be equal to the generation indicator of the volume.

4. The method of claim 1, wherein examining the antivirus information of the file comprises:
    examining a version number associated with an antivirus scan performed on the file; and
    when the version number does not reflect a current version, causing the file to be scanned for viruses with the current version.

5. The method of claim 4, wherein determining whether to allow access to the file comprises:
    when the version number reflects the current version, determining whether to allow access to the file based on scan status information of the file without performing a new antivirus scanning on the file.

6. The method of claim 5, wherein the antivirus information includes the version number and the scan status information of the file as a set of antivirus attributes of the file.

7. The method of claim 1, wherein the generation indicator of the volume is a generation number in a volume information block of a write anywhere file system, and the generation indicator of the file is a generation number in an inode block of the file.

8. A system for managing volume metadata, the system comprising:
    a processor;
    a memory coupled to the processor; and
    instructions executed by the processor from the memory to cause the processor to:
        update a generation indicator of a volume without updating a generation indicator of a file in the volume when the volume is relocated,
        compare the generation indicator of the file with the generation indicator of the volume when the file is requested for access;
        when the generation indicator of the file is equal to the generation indicator of the volume, examine antivirus information of the file,
        determine whether to allow access to the file based on the antivirus information, and
        update the generation indicator of the file and the antivirus information of the file when the file is requested for access, the request occurring after the volume is relocated.

9. The system of claim 8, wherein the instructions further cause the processor to cause the file to be scanned for viruses when the generation indicator of the file is not equal to the generation indicator of the volume.

10. The system of claim 9, wherein the instructions further cause the processor to update the generation indicator of the file to the generation indicator of the volume when the generation indicator of the file is not equal to the generation indicator of the volume.

11. The system of claim 8, wherein the instructions further cause the processor to:
    examine a version number associated with an antivirus scan performed on the file; and
    when the version number does not reflect a current version, cause the file to be scanned for viruses with the current version.

12. The system of claim 11, wherein the instructions further cause the processor to, when the version number reflects the current version, determine whether to allow access to the file based on scan status information of the file without performing a new antivirus scan on the file.

13. The system of claim 12, wherein the antivirus information includes the version number and the scan status information of the file as a set of antivirus attributes of the file.

14. The system of claim 8, wherein the generation indicator of the volume is a generation number in a volume information block of a write anywhere file system, and the generation indicator of the file is a generation number in an inode block of the file.

15. A computer-readable non-transitory storage medium storing instructions which, when executed by a computer, cause the computer to perform a method comprising:
    updating a generation indicator of a volume without updating a generation indicator of a file in the volume when the volume is relocated;
    comparing the generation indicator of the file with the generation indicator of the volume including the file when the file is requested for access;
    when the generation indicator of the file is equal to the generation indicator of the volume, examining antivirus information of the file;
    determining whether to allow access to the file based on the antivirus information; and
    updating the generation indicator of the file and the antivirus information of the file when the file is requested for access after the volume is relocated.

16. The computer-readable non-transitory storage medium of claim 15, wherein examining antivirus information of the file comprises:

examining a version number associated with an antivirus scanning performed on the file; and when the version number does not reflect a current version, causing the file to be scanned for viruses with the current version.

17. The computer-readable non-transitory storage medium of claim 15, wherein determining whether to allow access to the file comprises:

when the version number reflects the current version, determining whether to allow access to the file based on scan status information of the file without performing a new antivirus scanning on the file.

18. A method comprising:

providing, by a processor in a storage system, a generation indicator of a volume and a generation indicator of a file in the volume; and determining, by the storage system, whether to allow access to the file based on the generation indicator of the volume and the generation indicator of the file, wherein determining whether to allow access to the file includes:

allowing access to the file based on antivirus information for the file when the generation indicator of the file is equal to the generation indicator of the volume; and causing the file to be scanned for viruses when the generation indicator of the file is not equal to the generation indicator of the volume, updating the antivirus information for the file according to a virus scanning result, and allowing access to the file based on the updated antivirus information.

* * * * *